(12) United States Patent
Shimazumi et al.

(10) Patent No.: US 8,883,052 B2
(45) Date of Patent: Nov. 11, 2014

(54) POLYVINYL BUTYRAL RESIN PELLET, AND METHOD FOR PRODUCING THE SAME

(75) Inventors: Yuhi Shimazumi, Kurashiki (JP); Koichiro Isoue, Kurashiki (JP); Seiji Tanimoto, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 38 days.

(21) Appl. No.: 12/593,926

(22) PCT Filed: Mar. 21, 2008

(86) PCT No.: PCT/JP2008/055305
§ 371 (c)(1),
(2), (4) Date: Dec. 16, 2009

(87) PCT Pub. No.: WO2008/123150
PCT Pub. Date: Oct. 16, 2008

(65) Prior Publication Data
US 2010/0104866 A1    Apr. 29, 2010

(30) Foreign Application Priority Data

Mar. 30, 2007 (JP) .................................. 2007-093119

(51) Int. Cl.
*B29B 9/12* (2006.01)
*C08F 6/28* (2006.01)

(52) U.S. Cl.
CPC ........................................ *C08F 6/28* (2013.01)
USPC ............................................. 264/5; 264/204

(58) Field of Classification Search
USPC ....................................................... 264/5, 204
See application file for complete search history.

(56) References Cited

U.S. PATENT DOCUMENTS

| | | | | |
|---|---|---|---|---|
| 3,346,526 A | * | 10/1967 | Buckley et al. | 524/139 |
| 3,925,341 A | * | 12/1975 | Mueller-Tamm et al. | 528/481 |
| 4,155,971 A | * | 5/1979 | Wysong | 264/204 |
| 5,130,370 A | * | 7/1992 | Udipi et al. | 525/57 |
| 5,304,590 A | * | 4/1994 | Merz et al. | 524/235 |
| 5,886,075 A | * | 3/1999 | Keane et al. | 524/308 |
| 2002/0141282 A1 | * | 10/2002 | Tanaka et al. | 366/76.1 |
| 2003/0109636 A1 | | 6/2003 | Miyake | |
| 2003/0212203 A1 | * | 11/2003 | Hofmann | 525/63 |
| 2004/0175535 A1 | | 9/2004 | Bell | |
| 2008/0203593 A1 | | 8/2008 | Steuer et al. | |

FOREIGN PATENT DOCUMENTS

| | | | | |
|---|---|---|---|---|
| JP | 2002 201215 | | 7/2002 | |
| JP | 2005 60535 | | 3/2005 | |
| JP | 2005-060535 | * | 3/2005 | ............... C08F 8/48 |
| JP | 2006 47974 | | 2/2006 | |
| JP | 2006-047974 | * | 2/2006 | ............ G03C 1/498 |
| JP | 2006-030959 | * | 3/2006 | ............ G03C 1/498 |
| JP | 2007 502723 | | 2/2007 | |
| TW | 200417583 A | | 9/2004 | |

OTHER PUBLICATIONS

DE 19509244 Derwent, Nov. 1996, Germany.*

* cited by examiner

*Primary Examiner* — Yogendra Gupta
*Assistant Examiner* — Kimberly A Stewart
(74) *Attorney, Agent, or Firm* — Oblon, Spivak, McClelland, Maier & Neustadt, L.L.P.

(57) ABSTRACT

According to the present invention, a polyvinyl butyral resin pellet is provided that gives off little odor when produced and handled, as well as has a high apparent density and favorable handleability. The present invention includes a method for producing a polyvinyl butyral resin pellet including the steps of: melting polyvinyl butyral resin powder with a water content of 0.01 to 6 wt % by means of a melt extruder that has at least one vent portion for devolatilization equipped with vacuum means, and cutting the melt of the polyvinyl butyral resin after extrusion of it from the melt extruder. The present invention further includes a polyvinyl butyral resin pellet having a total content of butyl aldehyde and 2-ethyl-2-hexenal of 100 ppm or less.

15 Claims, No Drawings

US 8,883,052 B2

POLYVINYL BUTYRAL RESIN PELLET, AND METHOD FOR PRODUCING THE SAME

TECHNICAL FIELD

The present invention relates to a polyvinyl butyral resin pellet that gives off little odor when produced and handled, as well as has a high apparent density and favorable handleability, and to a method for producing the same.

BACKGROUND ART

Polyvinyl butyral resin is excellent in adhesion, heat resistance, transparency or the like, and therefore is widely used in various fields of applications as represented by, for example, coating materials, adhesive agents, binders, and various molded products. The polyvinyl butyral resin is produced and obtained as powder with a low apparent density by reacting polyvinyl alcohol with butyl aldehyde in water and/or an organic solvent in the presence of an acid catalyst, followed by performing the steps of washing, devolatilizing and drying. Since the polyvinyl butyral resin powder has a low apparent density, there has been a problem that it requires excessive volume of the storage for storing the powder for its weight, and furthermore, the transportation cost increases. Further, the polyvinyl butyral resin powder is stirred up when processed, thereby causing workability or working environment to deteriorate, and leading to a reduction in productivity.

In order to achieve a polyvinyl butyral resin with a high apparent density and the favorable handleability, pelletizing of polyvinyl butyral resin is known. For example, JP 2005-60535 A discloses a method for producing a polyvinyl butyral resin pellet including the steps of adjusting the water content of the polyvinyl butyral resin obtained by butyralizing polyvinyl alcohol with butyl aldehyde to 10 to 60 wt %, melting and kneading it by means of a melt extruder that has at least one vent portion for devolatilization equipped with vacuum means, and cutting it after extrusion into water (see claims, and [0001] and [0032] in the patent document). In this method, a polyvinyl butyral resin in the form of a wet cake having a high water content is melted and kneaded. As it is obvious from the below-described Comparative examples 1 to 2, there is a problem that an odor is given off when the polyvinyl butyral resin pellet is produced and handled.

WO 2005/019312 A1 discloses a polyvinyl butyral resin pellet that is processed into a desired shape by extruding polyvinyl butyral resin obtained by butyralizing polyvinyl alcohol with butyl aldehyde into the form of a strand by means of a melt extruder and then cutting it (see claims and [0030] in the patent document). However, there is no description about the water content of the polyvinyl butyral resin as a raw material, and neither method for reducing butyl aldehyde and 2-ethyl-2-hexenal contained in the resin pellet nor the content of butyl aldehyde and 2-ethyl-2-hexenal has been clarified.

Meanwhile, JP 2006-47974 A discloses a polyvinyl butyral resin for a heat developable photosensitive material having a content of 60 ppm or less of 2-ethyl-2-hexenal (see claims and [0006] in the patent document). According to this patent document, the content of 2-ethyl-2-hexenal is reduced because the neutralization following the reaction between polyvinyl alcohol and butyl aldehyde is carried out without high temperatures nor high alkali conditions, thereby inhibiting the formation of 2-ethyl-2-hexenal, or alternatively, only the polyvinyl butyral resin powder that has passed through a 60-mesh sieve is washed with a large amount of distilled water, thereby increasing washing efficiency. There is a description about how to reduce 2-ethyl-2-hexenal contained in the polyvinyl butyral resin powder in this patent document, however, nothing is revealed about how to reduce butyl aldehyde contained in the polyvinyl butyral resin. Further, there is no description about pelletizing the polyvinyl butyral resin powder by melt-extruding and cutting.

DISCLOSURE OF INVENTION

It is an object of the present invention to provide a polyvinyl butyral resin pellet that can overcome the above drawbacks present in conventional techniques, and gives off little odor when produced and handled, as well as has a high apparent density and favorable handleability.

As a result of diligent studies in order to solve the above problems, the inventors found that a polyvinyl butyral resin pellet that has a high apparent density and a favorable handleability, and gives off little odor when produced and handled can be obtained by the following production method.

That is, the present invention includes a method for producing a polyvinyl butyral resin pellet including the steps of: melting polyvinyl butyral resin powder with a water content of 0.01 to 6 wt % by means of a melt extruder that has at least one vent portion for devolatilization equipped with vacuum means; and cutting the melt of the polyvinyl butyral resin after extrusion of the melt from the melt extruder.

The water content of the polyvinyl butyral resin powder is preferably 0.5 to 5 wt %. It is preferable that the polyvinyl butyral resin powder be melted at a temperature from the melt temperature of the polyvinyl butyral resin to 280° C.

Further, the present invention includes a polyvinyl butyral resin pellet obtainable by the above-described production method.

Furthermore, the present invention includes a polyvinyl butyral resin pellet with a total content of butyl aldehyde and 2-ethyl-2-hexenal of 100 wt ppm or less.

In the present invention, the acid value of the polyvinyl butyral resin pellet is preferably 0.7 mg KOH/g or less. Further, the polyvinyl butyral resin pellet preferably has a size of 0.5 to 2.5 mm.

The polyvinyl butyral resin pellet of the present invention has a high apparent density and favorable handleability, and is characterized by giving off little odor when produced and handled.

BEST MODE FOR CARRYING OUT THE INVENTION

The present invention includes a method for producing a polyvinyl butyral resin pellet including the steps of: melting polyvinyl butyral resin powder with a water content of 0.01 to 6 wt % by means of a melt extruder that has at least one vent portion for devolatilization equipped with vacuum means (the melting step), and extruding the melt of the polyvinyl butyral resin from the melt extruder followed by cutting the melt (the extruding and cutting step).

Polyvinyl butyral resin powder with a water content of 0.01 to 6 wt % as a starting material can be obtained by producing polyvinyl butyral resin powder by a conventional method and adjusting its water content.

For example, polyvinyl butyral resin powder can be produced by using a vinyl alcohol-based polymer {e.g. polyvinyl alcohol (PVA)} as a raw material and butyralizing it.

The vinyl alcohol-based polymer can be obtained by a known method, for example, by saponifying a polymer obtained by polymerizing a vinyl ester-based monomer. Also, it can be obtained as a commercially available product. A known method can be applied for polymerizing a vinyl ester-based monomer, such as solution polymerization, bulk polymerization, suspension polymerization, and emulsion polymerization. For the polymerization, azo-type initiators, peroxide-type initiators, redox-type initiators, or the like can be selected appropriately as a polymerization initiator depending on the polymerization method.

As the vinyl ester-based monomer, for example, vinyl formate, vinyl acetate, vinyl propionate, vinyl butyrate, vinyl isobutyrate, vinyl pivalate, vinyl versatate, vinyl caproate, vinyl caprylate, vinyl laurylate, vinyl palmitate, vinyl stearate, vinyl oleate, vinyl benzoate, and a like may be used. Above all, vinyl acetate is used preferably.

When polymerizing the above vinyl ester-based monomer, another monomer may be copolymerized, without departing from the gist of the present invention. As another monomer, for example, α-olefins such as ethylene, propylene, n-butene, and isobutylene; acrylic acid or salts thereof; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid or salts thereof, methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, or acrylamide derivatives such as N-methyl acrylamide, N-ethyl acrylamide, N,N-dimethyl acrylamide, diacetone acrylamide, acrylamide propane sulfonic acid and salts thereof, acrylamide propyldimethylamine and acid salts thereof as well as quaternary salts thereof, and N-methylol acrylamide and derivatives thereof, methacrylamide or methacrylamide derivatives such as N-methyl methacrylamide, N-ethyl methacrylamide, methacrylamide propane sulfonic acid and salts thereof, methacrylamide propyldimethylamine and acid salts thereof as well as quaternary salts thereof, and N-methylol methacrylamide and derivatives thereof vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, and allyl chloride; maleic acid and salts thereof as well as esters thereof and anhydrides thereof, vinylsilyl compounds such as vinyltrimethoxysilane; and isopropenyl acetate or the like, may be used. These monomers may be used usually at a ratio of less than 10 mol % with respect to the vinyl ester-based monomer.

For saponification, known methods such as alcoholysis and hydrolysis using an alkali catalyst or acid catalyst may be applied, and specifically, a method using methanol as a solvent and caustic soda (NaOH) as a catalyst is preferable, because the method is easy and simple to perform.

A vinyl alcohol-based polymer obtained by saponifying a polymer obtained by polymerizing a vinyl ester-based monomer includes a vinyl alcohol unit and a vinyl ester unit derived from the above vinyl ester-based monomer, although the content ratio for each unit is different depending on the degree of the saponification. For example, when using vinyl acetate as a vinyl ester-based monomer, the vinyl alcohol-based polymer obtained by the above production method includes a vinyl alcohol unit and a vinyl acetate unit.

Butyralization of a vinyl alcohol-based polymer may be carried out based on a known method. For example, a vinyl alcohol-based polymer and butyl aldehyde may be mixed in the presence of an acid catalyst. The acid catalyst is not specifically limited; either an organic acid or inorganic acid may be used. Examples of the acid catalyst include acetic acid, p-toluenesulfonic acid, nitric acid, sulfuric acid, and hydrochloric acid. Above all, hydrochloric acid, sulfuric acid, and nitric acid are used generally, and particularly, it is preferable to use hydrochloric acid.

Although polyvinyl butyral is obtained by butyralizing a vinyl alcohol-based polymer with n-butyl aldehyde, aldehydes having a carbon number of 2 to 6 other than butyl aldehyde, such as acetaldehyde, propionaldehyde, n-hexylaldehyde, and 2-ethylbutylaldehyde, can be used in combination.

More detailed description about the method for producing polyvinyl butyral resin powder is as follow. First, the temperature of an aqueous solution of the vinyl alcohol-based polymer (with a concentration of 3 to 15 wt %) is adjusted to a range of about 80° C. to 100° C. Then, the temperature of the aqueous solution is lowered to a range of about −10° C. to −30° C. gradually (usually, taking about 10 to 60 minutes). Next, butyl aldehyde and a butyralization catalyst such as an acid catalyst, used for butyralization, are mixed with the aqueous solution having a temperature in a range of about −10° C. to −30° C., and the butyralization reaction is allowed to proceed for about 30 to 300 minutes with the temperature maintained constant. After that, the temperature is raised to a range of about 30° C. to 80° C. taking 30 to 200 minutes more, and then the temperature is maintained in this range for about 1 to 8 hours. Subsequently, after water washing and neutralization treatment by alkali or the like, polyvinyl butyral resin powder can be obtained by drying.

The water content of the polyvinyl butyral resin powder used in the present invention is 0.01 to 6 wt %. Since the water content is adjusted to 6 wt % or less, devolatilization of butyl aldehyde and 2-ethyl-2-hexenal is not prevented by excess devolatilization of water. As a result, odor of the polyvinyl butyral resin pellet to be obtained can be reduced. The maximum water content is preferably 5 wt % or less, more preferably 4 wt % or less. On the other hand, since powder tends to be dispersed when the water content is too low, which may cause a dust explosion, the water content is 0.01 wt % or more, preferably 0.5 wt % or more, more preferably 1 wt % or more.

Examples of the method for adjusting the water content of the polyvinyl butyral resin powder to 0.01 to 6 wt % include a method by washing the obtained polyvinyl butyral resin powder followed by fluidized drying or airborne drying at a temperature of 50° C. to 90° C. for 60 to 90 minutes, and a method by humidification.

In order to accomplish the objects of the present invention, devolatilization during melting, in other words, melting under vacuum is required. Accordingly, a melt extruder that has at least one vent portion for devolatilization equipped with vacuum means is used in the melting step. A melt extruder having a plurality of vent portions, for example, two vent portions, is preferable for the melt extruder. Examples of the melt extruder include a uniaxial melt extruder and biaxial melt extruder. As the conditions for devolatilization, a degree of vacuum is 0.05 MPa or more, preferably 0.07 MPa or more, more preferably 0.08 MPa or more. On the other hand, the maximum of the vacuum degree is not specifically limited, as long as devolatilization is possible, but may be 0.1 MPa or less, for example.

Melting of the polyvinyl butyral resin powder with a particular water content is carried out preferably at a temperature ranging from the melt temperature of polyvinyl butyral resin to 280° C. With respect to the operational conditions or the like of the melt extruder, those of known methods may be employed.

After the melting step, the extruding and cutting step follows. This step may be carried out by, for example, extruding the melt of polyvinyl butyral resin from the melt extruder followed by cooling and cutting it, or extruding it from the melt extruder into water followed by cutting it. Here, a method in which the melted resin is extruded in the form of a strand is preferable for the extruding method. As a cutting method, a method of cutting with a cutter such as a rotary cutter is preferable.

In the present invention, the polyvinyl butyral resin may include, as needed, another additive, e.g. antioxidant, plasticizer, and ultraviolet absorber. It does not matter when such an additive is added; it may be added before melting, during melting, or after melting.

The polyvinyl butyral resin pellet to be obtained in this manner has a high apparent density and favorable handleability, and gives off little odor when produced and handled. Further, the solvent solubility in a high concentration range is also excellent.

As a result of diligent studies, the inventors found that a polyvinyl butyral resin pellet produced by the above method that exhibits the above-described excellent properties has a feature that the total content of butyl aldehyde and 2-ethyl-2-hexenal is 100 wt ppm or less (hereinafter, "ppm" means "wt ppm"). The total content of butyl aldehyde and 2-ethyl-2-hexenal of 100 ppm or less is not feasible in the polyvinyl butyral resin pellets produced by conventional methods. This total content is strictly 90 ppm or less. Also, it can be 80 ppm or less, or even 50 ppm or less. The content of butyl aldehyde is strictly 80 ppm or less, more strictly 70 ppm or less. Also, it can be 40 ppm or less. The content of 2-ethyl-2-hexenal is strictly 60 ppm or less, more strictly 20 ppm or less. Also, it can be 10 ppm or less. Here, 2-ethyl-2-hexenal is a dimer of butyl aldehyde obtained in the process of producing the polyvinyl butyral resin.

In view of the above, the present invention includes a polyvinyl butyral resin pellet having a total content of butyl aldehyde and 2-ethyl-2-hexenal of 100 ppm or less.

The total content of butyl aldehyde and 2-ethyl-2-hexenal is preferably 80 ppm or less, more preferably 50 ppm or less. Further, the total content of butyl aldehyde and 2-ethyl-2-hexenal is preferably as low as possible, but usually it is 5 ppm or more, particularly 10 ppm or more.

The content of 2-ethyl-2-hexenal is preferably 60 ppm or less, more preferably 20 ppm or less, most preferably 10 ppm or less. Further, the content of butyl aldehyde is preferably 80 ppm or less, more preferably 70 ppm or less, most preferably 40 ppm or less. The content of butyl aldehyde and 2-ethyl-2-hexenal can be reduced by reducing the water content of the polyvinyl butyral resin powder in the above production method of the present invention.

It is more preferable in the present invention, in order to achieve the objects of the present invention described above, that the acid value of the polyvinyl butyral resin pellet be 0.7 mg KOH/g or less. More preferably, it is 0.5 mg KOH/g or less, most preferably 0.25 mg KOH/g or less. The acid value can be adjusted by changing the conditions for neutralization or washing of the resin that is carried out after the completion of the reaction.

Furthermore, the size of the polyvinyl butyral resin pellet is in a range of, preferably 0.5 to 2.5 mm, more preferably 0.7 to 2 mm. Here, "the size is in a range of 0.5 to 2.5 mm" means that, when the resin pellet is columnar in shape, its diameter is in a range of 0.5 to 2.5 mm and its length is in a range of 0.5 to 2.5 mm. When it is spherical in shape, its diameter is in a range of 0.5 to 2.5 mm, and further, when it is elliptic spherical in shape, both lengths of its major axis and minor axis are in a range of 0.5 to 2.5 mm. When it is prismatic in shape, the height and width of its cross section are both in a range of 0.5 to 2.5 mm, and its length is in a range of 0.5 to 2.5 mm. If the size of the pellet satisfies these conditions, a polyvinyl butyral resin pellet that is aimed at in the present invention can be obtained more suitably. Particularly, a polyvinyl butyral resin pellet with an excellent solvent solubility in a high concentration range can be obtained.

In the present invention, the ratio of remaining acetyl groups in a polyvinyl butyral resin pellet is preferably 0.1 to 30 mol %, more preferably 0.5 to 15 mol %. Further, the ratio of remaining hydroxyl groups in polyvinyl butyral is preferably 10 to 50 mol %, more preferably 15 to 40 mol %. The polyvinyl butyral resin pellet has a degree of butyralization of preferably 40 to 85 mol %, more preferably 50 to 80 mol %. The objects of the present invention can be accomplished more suitably by satisfying these conditions for remaining acetyl groups, remaining hydroxyl groups, and the degree of butyralization. Also, an excellent solvent solubility in a high concentration range can be achieved.

The degree of polymerization of the polyvinyl butyral is preferably in a range of 200 to 3000, more preferably 300 to 1700. When the degree of polymerization is within this range, the molding processability of the polyvinyl butyral resin pellet is favorable.

The content of halogen ion in the polyvinyl butyral resin pellet is preferably 100 ppm or less, more preferably 80 ppm or less. Here, halogen ion, e.g. chlorine ion, is derived from the halide used as a catalyst when producing the polyvinyl butyral. The content of halogen ion in the polyvinyl butyral resin pellet can be adjusted by appropriately selecting the method and frequency of washing when washing the polyvinyl butyral with water or a mixed solution of water/alcohol.

The content of alkali metal ion in the polyvinyl butyral resin pellet is preferably 100 ppm or less, more preferably 80 ppm or less. Here, alkali metal ion, e.g. sodium ion and potassium ion, is derived from the alkali metal compound used in the step of producing the vinyl alcohol-based polymer and the step of producing polyvinyl butyral. The content of alkali metal ion in the polyvinyl butyral resin pellet can be adjusted by appropriately selecting the method and frequency of washing when washing the vinyl alcohol-based polymer and/or polyvinyl butyral with water or a mixed solution of water/alcohol.

The polyvinyl butyral resin pellet of the present invention is useful for binders for heat developable photosensitive materials, binders for ceramics green sheets, binders for coating materials, various dispersants, and pellet materials for powder coating.

Hereafter, the present invention is described in detail by way of example, but the present invention is not limited by these examples in any way. It should be noted that "%" means "weight %" in the following examples and comparative examples, as long as no particular description is given. Various properties of the polyvinyl butyral (PVB) resin pellet produced in the examples and comparative examples were measured by the following method.

(Content Ratio of Vinyl Acetate Unit in PVB Resin Pellet)
It was measured based on JIS K6728:1977.
(Content Ratio of Vinyl Alcohol Unit in PVB Resin Pellet)
It was measured based on JIS K6728:1977.
(Measurement of Acid Value of PVB Resin Pellet)
It was measured based on JIS K6728:1977.

(Content of Butyl Aldehyde and 2-Ethyl-2-Hexenal in PVB Resin Pellet)

It was measured using a headspace gas chromatography, GC-14B manufactured by SHIMADZU CORPORATION, as a measuring device, and TC-1 (with an internal diameter of 0.25 mm and a length of 30 m) manufactured by GL Science INC., as a column.

(Content of Halogen Ion in Polyvinyl Butyral Resin Pellet)

It was calculated from the conductivity transition point obtained using a potentiometric titrator by dissolving the polyvinyl butyral resin pellet in a mixed solution of ethanol/water, and dropping a silver nitrate aqueous solution thereinto.

(Content of Alkali Metal Ion in Polyvinyl Butyral Resin Pellet)

It was measured using an Inductively Coupled Plasma (ICP) emission element analyzer.

(Water Content of PVB Resin Pellet)

It was calculated from the following formula, drying the PVB resin pellet at 105° C. for 3 hours with a dryer:

{(weight of resin pellet before drying−weight of resin pellet after drying)/weight of resin pellet before drying}×100(%).

(Water Content of PVB Resin Powder to be Fed into Extruder)

It was calculated from the following formula, drying the PVB resin powder at 105° C. for 3 hours with a dryer:

{(weight of resin powder before drying−weight of resin powder after drying)/weight of resin powder before drying}×100(%).

(Measurement of Size of PVB Resin Pellet)

The lengths and diameters with respect to 30 PVB resin pellets taken out at random were measured with a vernier caliper, and the mean value was calculated. The MD direction was taken as the length in the measurement.

(Apparent density of PVB Resin Pellet)

It was measured based on JIS K6721:1994, using a bulk density measuring device (manufactured by TSUTSUI SCIENTIFIC INSTRUMENTS CO., LTD.).

(Solubility of PVB Resin Pellet)

1. Solubility in a Low Concentration Range

An ethanol solution with a resin concentration of 10 wt % was obtained by adding 10 g of the PVB resin pellet to 90 g of ethanol under stirring, and it was stirred at 20° C. with a mechanical stirrer at a rotation number of 200 rpm. The condition of the resin pellet was observed by a visual inspection, and the time it took to dissolve the resin pellet completely was measured.

2. Solubility in a High Concentration Range

An ethanol solution with a resin concentration of 20 wt % was obtained by adding 20 g of the PVB resin pellet to 80 g of ethanol under stirring, and it was stirred at 20° C. with a mechanical stirrer at a rotation number of 200 rpm. The condition of the resin pellet was observed by a visual inspection, and the time it took to dissolve the resin pellet completely was measured.

(Measurement of Odor from PVB Resin Pellet)

When the resin pellet was produced and it was handled, the odor from the PVB resin pellet was detected by an organoleptic test, and evaluated by the following criteria:

○: little odor was perceived; or

×: odor was perceived.

Example 1

(Preparation of PVB Resin Powder)

1295 g of ion-exchanged water and 105 g of polyvinyl alcohol (PVA-1: the degree of polymerization was 300, the degree of saponification was 98 mol %) were put into a glass container with an internal volume of 2 liter that was equipped with a reflux condenser, a thermometer and an anchor-shaped stirrer blade. Then, the whole temperature was raised to 95° C. so that the PVA was dissolved completely, and thus a PVA aqueous solution (having a concentration of 7.5 wt %) was obtained. The obtained PVA aqueous solution was cooled gradually to 10° C. taking about 30 minutes, with stirring at a rotation speed of 120 rpm. After that, 58 g of butyl aldehyde and 90 ml of hydrochloric acid with a concentration of 20 wt % as an acid catalyst that was a butyralization catalyst were added thereto, so that butyralization of the PVA was started. After the butyralization for 150 minutes, the whole temperature was raised to 50° C. taking 60 minutes. The temperature was maintained at 50° C. for 120 minutes, and then it was cooled to room temperature. After filtration of the resin that had been precipitated by the cooling, the resin was washed with ion-exchanged water (100 times more amount of ion-exchanged water than that of the resin), and then 0.3 wt % of a sodium hydroxide solution was added thereto for neutralization. It was maintained at 40° C. for 10 hours, and then washed with 100 times more amount of ion-exchanged water again, followed by dehydration. It was dried at 40° C. under vacuum for 18 hours, and thereby polyvinyl butyral (PVB-1) powder (with a water content of 1.0 wt %) was obtained.

(Preparation of PVB Resin Pellet)

A unidirectionally rotating biaxial extruder with L/D=54 (manufactured by TOSHIBA MACHINE CO., LTD.) equipped with two vent portions having a vacuum degree of 0.08 MPa and 0.09 MPa from the hopper side was used as a melt extruder. The above obtained polyvinyl butyral (PVB-1) powder was fed into this. The melt resin in the form of a strand extruded from the die holes was cooled in a water bath, and then was cut by a pelletizer, so that a polyvinyl butyral resin (with a water content of 0.2 wt %) with a diameter of 1.6 mm and a length of 1.6 mm, in the form of a pellet was obtained. The melt resin was extruded under the conditions of a screw speed of 300 rpm, a resin extrusion rate of 120 kg/h, and a resin temperature of 200° C.

The polyvinyl butyral resin pellet had a degree of butyralization of 68 mol %, a remaining acetyl group (vinyl acetate unit) content ratio of 2 mol %, and a remaining hydroxyl group (vinyl alcohol unit) content ratio of 30 mol %. The content of butyl aldehyde was 16 ppm, the content of 2-ethyl-2-hexenal was 2 ppm, the content of halogen ion was 40 ppm, the content of alkali metal ion was 20 ppm, the apparent density was 0.61 g/cc, and the acid value was 0.20 mg KOH/g. The properties of the polyvinyl butyral resin pellet are indicated in Table 1.

Example 2

Polyvinyl butyral (PVB-2) powder (with a water content of 1.0 wt %) was obtained in the same manner as Example 1, except that another polyvinyl alcohol (PVA-2: the degree of polymerization was 600, the degree of saponification was 98 mol %) was used instead of PVA-1. A polyvinyl butyral resin pellet (with a water content of 0.2 wt %) was obtained by adjusting the water content of the polyvinyl butyral powder to 1.5 wt % followed by feeding the powder into a melt extruder in the same manner as Example 1. Thus obtained polyvinyl butyral resin pellet had a degree of butyralization of 78 mol %, a vinyl acetate unit content ratio of 2 mol %, and a vinyl alcohol unit content ratio of 20 mol %. The content of butyl aldehyde was 21 ppm, the content of 2-ethyl-2-hexenal was 4 ppm, the content of halogen ion was 50 ppm, the content of alkali metal ion was 20 ppm, the apparent density was 0.62 g/cc, and the acid value was 0.25 mg KOH/g. The properties of the polyvinyl butyral resin pellet are indicated in Table 1.

Example 3

Polyvinyl butyral (PVB-3) powder (with a water content of 1.0 wt %) was obtained in the same manner as Example 1, except that another polyvinyl alcohol (PVA-3: the degree of polymerization was 1000, the degree of saponification was 98 mol %) was used instead of PVA-1. A polyvinyl butyral resin pellet (with a water content of 0.3 wt %) was obtained by adjusting the water content of the polyvinyl butyral powder to 3 wt % followed by feeding the powder into a melt extruder in the same manner as Example 1. Thus obtained polyvinyl butyral resin pellet had a degree of butyralization of 68 mol %, a vinyl acetate unit content ratio of 2 mol %, and a vinyl alcohol unit content ratio of 30 mol %. The content of butyl aldehyde was 40 ppm, the content of 2-ethyl-2-hexenal was 9 ppm, the content of halogen ion was 40 ppm, the content of alkali metal ion was 20 ppm, the apparent density was 0.61 g/cc, and the acid value was 0.35 mg KOH/g. The properties of the polyvinyl butyral resin pellet are indicated in Table 1.

Example 4

A polyvinyl butyral resin pellet (with a water content of 1.2 wt %) was obtained in the same manner as Example 1, except that the water content of the polyvinyl butyral (PVB-1) powder was adjusted to 5.5 wt % followed by feeding the powder into a melt extruder. Thus obtained polyvinyl butyral resin pellet had a degree of butyralization of 68 mol %, a vinyl acetate unit content ratio of 2 mol %, and a vinyl alcohol unit content ratio of 30 mol %. The content of butyl aldehyde was 63 ppm, the content of 2-ethyl-2-hexenal was 17 ppm, the content of halogen ion was 40 ppm, the content of alkali metal ion was 20 ppm, the apparent density was 0.61 g/cc, and the acid value was 0.20 mg KOH/g. The properties of the polyvinyl butyral resin pellet are indicated in Table 1.

Comparative Example 1

A polyvinyl butyral resin pellet (with a water content of 1.2 wt %) was obtained in the same manner as Example 1, except that the water content of the polyvinyl butyral (PVB-1) powder was adjusted to 42 wt % followed by feeding the powder into a melt extruder. Thus obtained polyvinyl butyral resin pellet had a degree of butyralization of 68 mol %, a vinyl acetate unit content ratio of 2 mol %, and a vinyl alcohol unit content ratio of 30 mol %. The content of butyl aldehyde was 109 ppm, the content of 2-ethyl-2-hexenal was 118 ppm, the content of halogen ion was 40 ppm, the content of alkali metal ion was 20 ppm, the apparent density was 0.61 g/cc, and the acid value was 1.0 mg KOH/g. The properties of the polyvinyl butyral resin pellet are indicated in Table 1.

Comparative Example 2

A polyvinyl butyral resin pellet (with a water content of 0.8 wt %) was obtained in the same manner as Example 1, except that the water content of the polyvinyl butyral (PVB-1) powder was adjusted to 15 wt % followed by feeding the powder into a melt extruder. Thus obtained polyvinyl butyral resin pellet had a degree of butyralization of 68 mol %, a vinyl acetate unit content ratio of 2 mol %, and a vinyl alcohol unit content ratio of 30 mol %. The content of butyl aldehyde was 79 ppm, the content of 2-ethyl-2-hexenal was 92 ppm, the content of halogen ion was 40 ppm, the content of alkali metal ion was 20 ppm, the apparent density was 0.61 g/cc, and the acid value was 0.9 mg KOH/g. The properties of the polyvinyl butyral resin pellet are indicated in Table 1.

Comparative Example 3

A polyvinyl butyral resin pellet (with a water content of 0.9 wt %) was obtained in the same manner as Example 1, except that devolatilization was not carried out when extruding the melt resin. Thus obtained polyvinyl butyral resin pellet had a degree of butyralization of 68 mol %, a vinyl acetate unit content ratio of 2 mol %, and a vinyl alcohol unit content ratio of 30 mol %. The content of butyl aldehyde was 152 ppm, the content of 2-ethyl-2-hexenal was 87 ppm, the content of halogen ion was 40 ppm, the content of alkali metal ion was 20 ppm, the apparent density was 0.61 g/cc, and the acid value was 1.2 mg KOH/g. The properties of the polyvinyl butyral resin pellet are indicated in Table 1.

Comparative Example 4

Various properties of the polyvinyl butyral (PVB-1) powder (with a water content of 1.0 wt %) obtained in Example 1 were measured. As a result, the degree of butyralization was 68 mol %, the remaining acetyl group (vinyl acetate unit) content ratio was 2 mol %, and the remaining hydroxyl group (vinyl alcohol unit) content ratio was 30 mol %. The content of butyl aldehyde was 113 ppm, the content of 2-ethyl-2-hexenal was 128 ppm, the content of halogen ion was 40 ppm, the content of alkali metal ion was 20 ppm, the apparent density was 0.21 g/cc, and the acid value was 1.5 mg KOH/g. The properties of the polyvinyl butyral (PVB-1) powder are indicated in Table 1.

TABLE 1

| | | POLY VINYL BUTYRAL RESIN PELLET | | | | | |
|---|---|---|---|---|---|---|---|
| | POLY VINYL ALCOHOL | REMAINING ACETYL GROUP (mol %) | REMAINING HYDROXYL GROUP (mol %) | WATER CONTENT OF PVB POWDER WHEN FED INTO EXTRUDER (wt %) | ACID VALUE (mg KOH/g) | CONTENT OF BUTYL-ALDEHYDE (ppm) | CONTENT OF 2-ETHYL-2-HEXENAL (ppm) |
| Ex. 1 | PVA-1 | 2 | 30 | 1.0 | 0.20 | 16 | 2 |
| Ex. 2 | PVA-2 | 2 | 20 | 1.5 | 0.25 | 21 | 4 |
| Ex. 3 | PVA-3 | 2 | 30 | 3 | 0.35 | 40 | 9 |
| Ex. 4 | PVA-1 | 2 | 30 | 5.5 | 0.20 | 63 | 17 |
| C. Ex. 1 | PVA-1 | 2 | 30 | 42 | 1.0 | 109 | 118 |
| C. Ex. 2 | PVA-1 | 2 | 30 | 15 | 0.9 | 79 | 92 |

TABLE 1-continued

| | | | | | | | |
|---|---|---|---|---|---|---|---|
| C. Ex. 3 | PVA-1 | 2 | 30 | 1.0 | 1.2 | 152 | 87 |
| C. Ex. 4 | PVA-1 | 2 | 30 | — | 1.5 | 113 | 128 |

| | POLY VINYL BUTYRAL RESIN PELLET | | | | | | |
|---|---|---|---|---|---|---|---|
| | PELLET SIZE (mm) (UPPER: DIAMETER LOWER: LENGTH) | APPARENT DENSITY (g/cc) | CONTENT OF HALO-GEN ION (ppm) | CONTENT OF ALKALI METAL ION (ppm) | SOLUBILITY IN LOW CONCEN-TRATION RANGE (hr) | SOLUBILITY IN LOW CONCEN-TRATION RANGE (hr) | ODOR |
| Ex. 1 | 1.6 / 1.6 | 0.61 | 40 | 20 | 1.5 | 3 | ○ |
| Ex. 2 | 1.6 / 1.6 | 0.62 | 50 | 20 | 1.5 | 3 | ○ |
| Ex. 3 | 1.6 / 1.6 | 0.61 | 40 | 20 | 1.5 | 3 | ○ |
| Ex. 4 | 1.6 / 1.6 | 0.61 | 40 | 20 | 1.5 | 3 | ○ |
| C. Ex. 1 | 1.6 / 1.6 | 0.61 | 40 | 20 | 1.5 | 3 | x |
| C. Ex. 2 | 1.6 / 1.6 | 0.61 | 40 | 20 | 1.5 | 3 | x |
| C. Ex. 3 | 1.6 / 1.6 | 0.61 | 40 | 20 | 1.5 | 3 | x |
| C. Ex. 4 | — | 0.21 | 40 | 20 | 1.5 | 9 | x |

INDUSTRIAL APPLICABILITY

A polyvinyl butyral resin pellet of the present invention has a favorable handleability due to its high apparent density. In addition, it gives off little odor when produced and handled, and what is more, it has an excellent solvent solubility in a high concentration range. Therefore, it is useful for binders for heat developable photosensitive materials, binders for ceramics green sheets, binders for coating materials, various dispersants, and pellet materials for powder coating, for example.

The invention claimed is:

1. A method for producing a polyvinyl butyral resin pellet comprising:
    adjusting a water content of polyvinyl butyral resin powder to 0.01 to 6 wt.%;
    melting polyvinyl butyral resin powder with a water content of 0.01 to 6 wt% in a melt extruder that includes at least one vent portion for devolatilization equipped with a vacuum and extruding a melt of polyvinyl butyral resin without adding water to said extruder during melting and extruding; and
    cutting a melt of the polyvinyl butyral resin after extrusion of the melt from the melt extruder
    wherein said melt of the polyvinyl butyral resin after extrusion has a total content of butyl aldehyde and 2-ethyl-2-hexenal of 100 wt. ppm or less.

2. The method for producing a polyvinyl butyral resin pellet according to claim 1, wherein the water content of the polyvinyl butyral resin powder is 0.5 to 5 wt %.

3. The method for producing a polyvinyl butyral resin pellet according to claim 1, wherein melting of the polyvinyl butyral resin powder is carried out at a temperature ranging from the melt temperature of polyvinyl butyral resin to 280° C.

4. The method for producing a polyvinyl butyral resin pellet according to claim 1, wherein the water content of the polyvinyl butyral resin powder is 1 to 4 wt %.

5. The method for producing a polyvinyl butyral resin pellet according to claim 1, further comprising washing said polyvinyl butyral resin powder followed by fluidized drying or airborne drying, prior to melting.

6. The method for producing a polyvinyl butyral resin pellet according to claim 1, wherein said vacuum is 0.05 MPa or more.

7. The method for producing a polyvinyl butyral resin pellet according to claim 1, wherein said vacuum is 0.07 MPa or more.

8. The method for producing a polyvinyl butyral resin pellet according to claim 1, wherein said melt of the polyvinyl butyral resin after extrusion has a total content of butyl aldehyde and 2-ethyl-2-hexenal of 50 wt. ppm or less.

9. The method for producing a polyvinyl butyral resin pellet according to claim 1, wherein said melt of the polyvinyl butyral resin after extrusion has a content of butyl aldehyde of 80 wt. ppm or less.

10. The method for producing a polyvinyl butyral resin pellet according to claim 1, wherein said melt of the polyvinyl butyral resin after extrusion has a content of butyl aldehyde of 40 wt. ppm or less.

11. The method for producing a polyvinyl butyral resin pellet according to claim 1, wherein said melt of the polyvinyl butyral resin after extrusion has a content of 2-ethyl-2-hexenal of 60 wt. ppm or less.

12. The method for producing a polyvinyl butyral resin pellet according to claim 1, wherein said melt of the polyvinyl butyral resin after extrusion has a content of 2-ethyl-2-hexenal of 10 wt. ppm or less.

13. The method for producing a polyvinyl butyral resin pellet according to claim 1, wherein said melt of the polyvinyl butyral resin after extrusion has an acid value of 0.7 mg KOH/g or less.

14. The method for producing a polyvinyl butyral resin pellet according to claim 1, wherein said melt of the polyvinyl butyral resin after extrusion has an acid value of 0.5 mg KOH/g or less.

15. The method for producing a polyvinyl butyral resin pellet according to claim 1, wherein said melt of the polyvinyl butyral resin after extrusion has an acid value of 0.25 mg KOH/g or less.

* * * * *